United States Patent [19]
Brown, Jr.

[11] Patent Number: 6,051,769
[45] Date of Patent: Apr. 18, 2000

[54] COMPUTERIZED READING DISPLAY

[76] Inventor: Donival Brown, Jr., 206 Cornwall Ave., Trenton, N.J. 08618

[21] Appl. No.: 09/199,102
[22] Filed: Nov. 25, 1998
[51] Int. Cl.[7] .................................................. G09B 15/02
[52] U.S. Cl. ...................... 84/477 R; 84/484; 84/483.1; 84/470 R
[58] Field of Search ............................ 84/470 R, 477 R, 84/484, 483.1

[56] References Cited

U.S. PATENT DOCUMENTS

| | | | |
|---|---|---|---|
| 5,339,091 | 8/1994 | Yamazaki et al. | 345/104 |
| 5,689,077 | 11/1997 | Jasinski | 84/477 R |
| 5,760,323 | 6/1998 | Romero et al. | 84/470 R |

Primary Examiner—Robert E. Nappi
Assistant Examiner—Shih-yung Hsieh

[57] ABSTRACT

An electronic reading system is provided including a housing and a display mounted on the housing. Also included is a storage device drive positioned within the housing for removably receiving a portable storage device and reading therefrom reading indicia. Next provided is an input device for accepting signals. A controller is positioned within the housing and connected between the display, the storage device drive, and the input device. In use, the controller serves to read the reading indicia from the portable storage device and display the same on the display while manipulating the reading indicia on the display as a function of the signals received from the input device.

9 Claims, 3 Drawing Sheets

COMPUTERIZED READING DISPLAY

BACKGROUND OF THE INVENTION

1. Field of the Invention

The present invention relates to music readers and more particularly pertains to a new computerized reading display for allowing a user to read music without the need for manual intervention.

2. Description of the Prior Art

The use of music readers is known in the prior art. More specifically, music readers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,350,070; U.S. Pat. No. 5,534,888; U.S. Pat. No. 346,620; U.S. Pat. No. 5,697,793; U.S. Pat. No. 3,086,297; and U.S. Pat. No. 5,339,091.

In these respects, the computerized reading display according to the present invention substantially departs from the conventional concepts and designs of the prior art, and in so doing provides an apparatus primarily developed for the purpose of allowing a user to read music without the need for manual intervention.

SUMMARY OF THE INVENTION

In view of the foregoing disadvantages inherent in the known types of music readers now present in the prior art, the present invention provides a new computerized reading display construction wherein the same can be utilized for allowing a user to read music without the need for manual intervention.

The general purpose of the present invention, which will be described subsequently in greater detail, is to provide a new computerized reading display apparatus and method which has many of the advantages of the music readers mentioned heretofore and many novel features that result in a new computerized reading display which is not anticipated, rendered obvious, suggested, or even implied by any of the prior art music readers, either alone or in any combination thereof.

To attain this, the present invention generally comprises a housing having a pair of panels each with a planar rectangular configuration and having an inner face, an outer face and a thin periphery formed therebetween. As shown in FIGS. 1–3, the panels of the housing are hingably coupled along the peripheries thereof for being folded in a first orientation with the inner faces abutting and a second orientation with the inner faces in coplanar relationship. Also included is a pair of liquid crystal displays each mounted on one of the inner faces of the panels for displaying music reading indicia thereon. Each panel defines a frame on the inner face of the associated panel. Such frame is defined by a top portion, a bottom portion, an inner side portion and an outer side portion. Also included is a microphone mounted on the top portion of the frame of a first one of the panels adjacent to the inner side portion. In use, the microphone serves for receiving audio signals. FIG. 1 shows a metronome unit mounted on the outer side portion of the frame of the first panel adjacent to the top portion thereof. In operation, the metronome unit is adapted for generating a plurality of intermittent signals upon the actuation thereof. As shown in FIG. 1, the metronome unit includes a vertical slider switch for selecting a speed at which the intermittent signals are generated. Positioned below the slider switch is a push button for selectively actuating the metronome unit. FIG. 4 shows a speaker for audibly transmitting the intermittent signals. Finally, a mute button of the metronome unit is adapted for selectively deactuating the speaker. FIG. 1 depicts the portable unit including a case with a rectangular configuration. The portable unit has a top face having a plurality of numeric keys, a play button, a pause button, a stop button, and a pair of toggle keys. In use, the portable unit is removably connected to a port on the bottom portion of the frame of the first panel via an elongated wire. Positioned within the housing is a storage device drive for removably receiving a portable storage device and reading therefrom music reading indicia. Finally, a controller is positioned within the housing and connected between the displays, the microphone, the metronome unit, the portable unit, and the storage device drive. In operation, the controller is adapted to read the music reading indicia from the portable storage device and display the same on the displays while operating in various modes. In a first mode of operation, the controller is adapted for manipulating the music reading indicia on the display as a function of the audio signals received via the microphone. In a second mode of operation, the controller manipulates the music reading indicia on the display as a function of the intermittent signals received from the metronome unit. Finally, the controller unit manipulates the music reading indicia on the display as a function of the depression of the toggle keys of the portable unit in a third mode of operation. It should be noted that the controller serves to manipulate the music reading indicia using a plurality of methods including scrolling the music reading indicia page-by-page upwardly, scrolling the music reading indicia page-by-page laterally, and highlighting the music reading indicia between scrolling.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computerized reading display apparatus and method which has many of the advantages of the music readers mentioned heretofore and many novel features that result in a new computerized reading display which is not anticipated, rendered obvious, suggested, or even implied by any of the prior art music readers, either alone or in any combination thereof.

It is another object of the present invention to provide a new computerized reading display which may be easily and efficiently manufactured and marketed.

It is a further object of the present invention to provide a new computerized reading display which is of a durable and reliable construction.

An even further object of the present invention is to provide a new computerized reading display which is susceptible of a low cost of manufacture with regard to both materials and labor, and which accordingly is then susceptible of low prices of sale to the consuming public, thereby making such computerized reading display economically available to the buying public.

Still yet another object of the present invention is to provide a new computerized reading display which provides in the apparatuses and methods of the prior art some of the advantages thereof, while simultaneously overcoming some of the disadvantages normally associated therewith.

Still another object of the present invention is to provide a new computerized reading display for allowing a user to read music without the need for manual intervention.

Even still another object of the present invention is to provide a new computerized reading display that includes a housing and a display mounted on the housing. Also included is a storage device drive positioned within the housing for removably receiving a portable storage device and reading therefrom reading indicia. Next provided is an input device for accepting signals. A controller is positioned within the housing and connected between the display, the storage device drive, and the input device. In use, the controller serves to read the reading indicia from the portable storage device and display the same on the display while manipulating the reading indicia on the display as a function of the signals received from the input device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
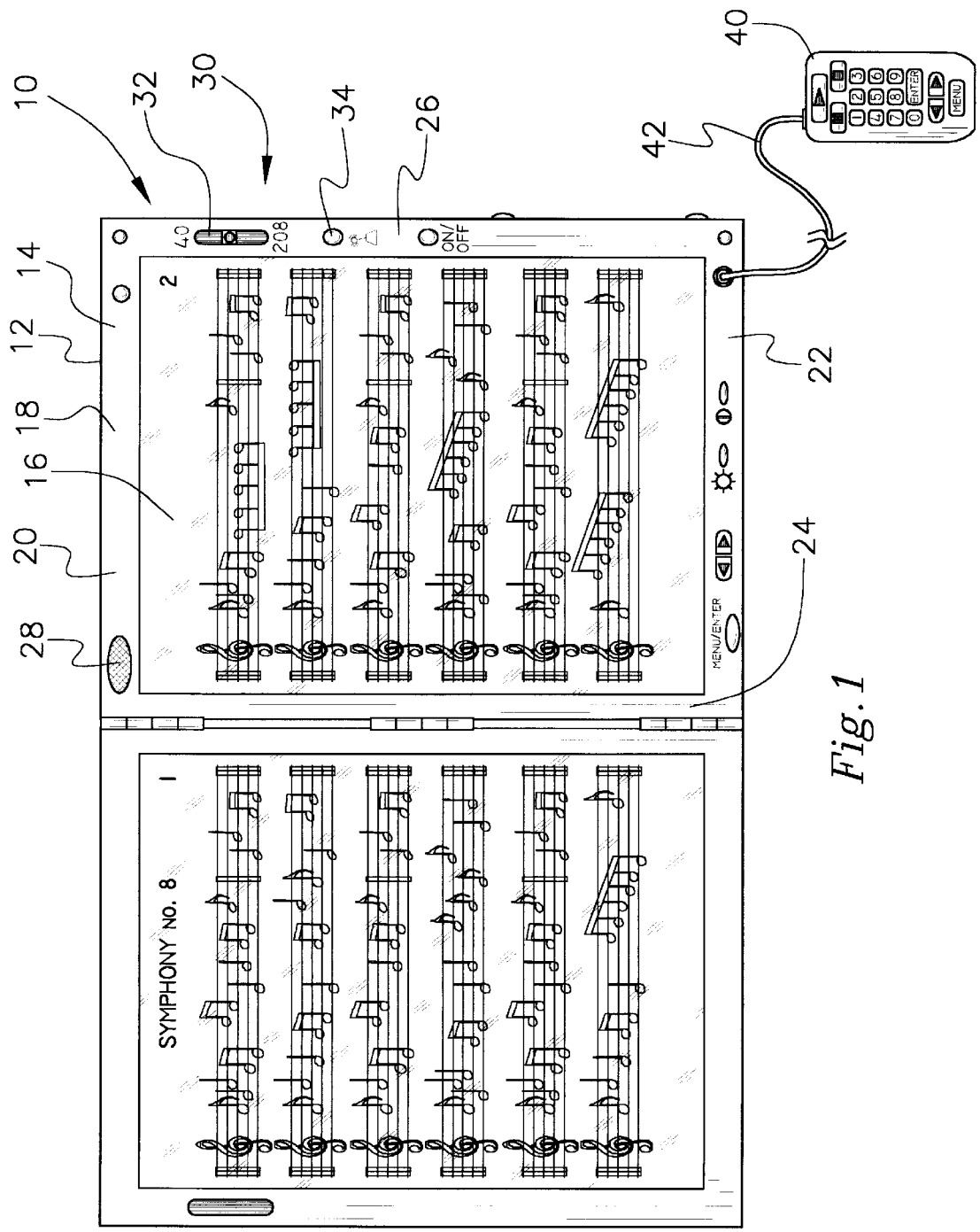
FIG. 1 is a front view of a new computerized reading display according to the present invention.

With reference now to the drawings, and in particular to FIGS. 1 through 5 thereof, a new computerized reading display embodying the principles and concepts of the present invention and generally designated by the reference numeral 10 will be described.

Figure 2:
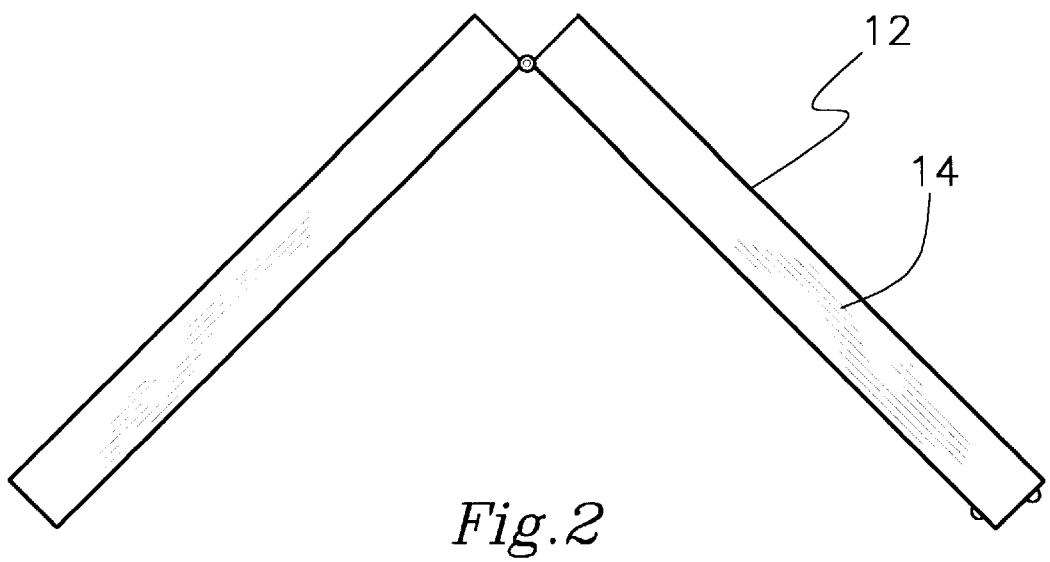
FIG. 2 is a side view of the present invention with the panels partially folded.
Figure 3:
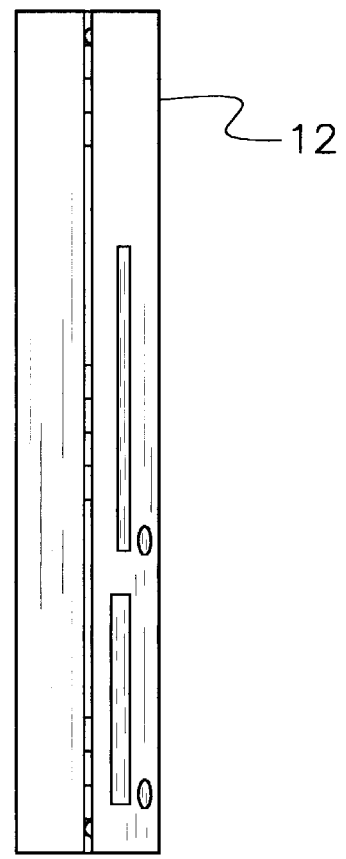
FIG. 3 is a side view of the present invention with the panels folded.

The present invention, designated as numeral 10, includes a housing 12 having a pair of panels 14 each with a planar rectangular configuration and having an inner face, an outer face and a thin periphery formed therebetween. As shown in FIGS. 1–3, the panels of the housing are hingably coupled along the peripheries thereof for being folded in a first orientation with the inner faces abutting and a second orientation with the inner faces in coplanar relationship.

Also included is a pair of liquid crystal displays 16 each mounted on one of the inner faces of the panels for displaying music reading indicia thereon. Such music reading indicia includes a plurality of measures and staffs, as specifically shown in FIG. 1. In the alternative, the music reading indicia may be replaced with conventional reading indicia including alphabetic characters. Each panel defines a frame 18 on the inner face of the associated panel. Such frame is defined by a top portion 20, a bottom portion 22, an inner side portion 24 and an outer side portion 26.

Also included is a microphone 28 mounted on the top portion of the frame of a first one of the panels adjacent to the inner side portion. In use, the microphone serves for receiving audio signals. A grill is preferably positioned over the microphone to prevent any damage thereto.

Figure 4:
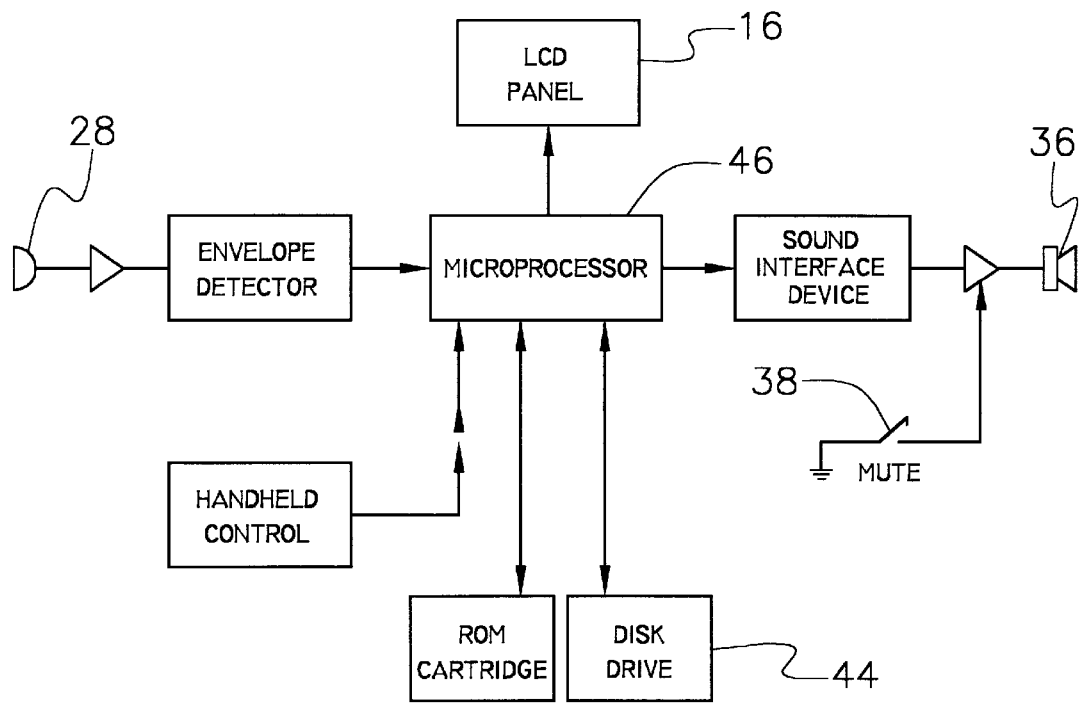
FIG. 4 is a schematic diagram of the various electrical components of the present invention.
Figure 5:
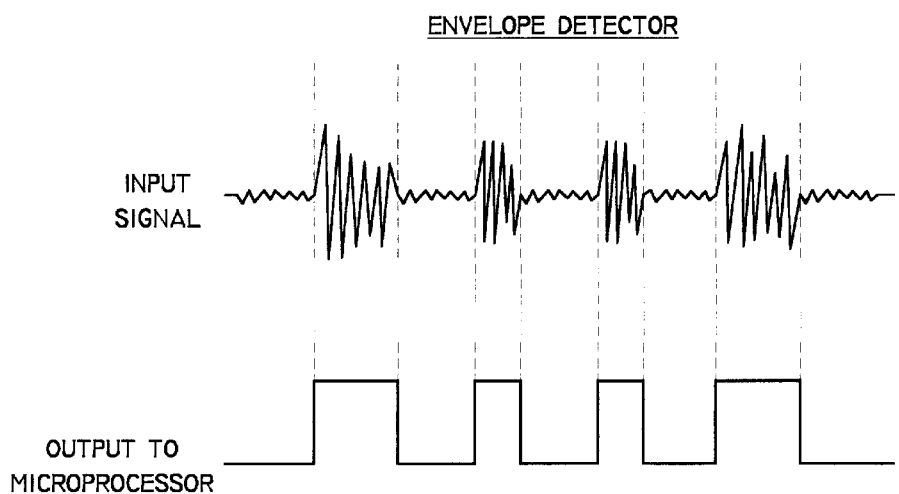
FIG. 5 is an illustration of how the present invention is adapted to control the display as a function of received audio signals.

FIG. 1 shows a metronome unit 30 mounted on the outer side portion of the frame of the first panel adjacent to the top portion thereof. In operation, the metronome unit is adapted for generating a plurality of intermittent signals upon the actuation thereof. As shown in FIG. 1, the metronome unit includes a vertical slider switch 32 for selecting a speed at which the intermittent signals are generated. Positioned below the slider switch is a push button 34 for selectively actuating the metronome unit. FIG. 4 shows a speaker 36 for audibly transmitting the intermittent signals. Finally, a mute button 38 of the metronome unit is adapted for selectively deactuating the speaker.

FIG. 1 depicts the portable unit including a case 40 with a rectangular configuration. The portable unit has a top face including a plurality of numeric keys, a play button, a pause button, a stop button, and a pair of toggle keys (or switches). In use, the portable unit is removably connected to a port on the bottom portion of the frame of the first panel via an elongated wire 42. Positioned within the housing is a storage device drive 44 for removably receiving a portable storage device and reading therefrom music reading indicia. Ideally, the portable storage device consists of both a compact disc drive and a floppy disk drive. Note FIG. 3.

Finally, a controller 46 is positioned within the housing and connected between the displays, the microphone, the metronome unit, the portable unit, and the storage device drive. In operation, the controller is adapted to read the music reading indicia from the portable storage device and display the same on the displays while operating in various modes. In a first mode of operation, the controller is adapted for manipulating the music reading indicia on the display as a function of the audio signals received via the microphone. To accomplish this, an envelope detector may be used to convert sound perturbations into intermittent signals which may in turn be used as reference beats. By counting such reference beats, the controller may manipulate the music reading indicia on the display such that manual manipulation is not necessary. As an option, audio filters and software processing may be employed to distinguish between sounds and calculate the exact beat. At the very least, only a portion of the sounds need be detected to ascertain the reference beat and continue scrolling based on the previously ascertained reference beat. In the alternative, the controller may be adapted to merely recognize key voice signals or words.

In a second mode of operation, the controller manipulates the music reading indicia on the display as a function of the intermittent signals received from the metronome unit. Finally, the controller unit manipulates the music reading indicia on the display as a function of the depression of the toggle keys of the portable unit in a third mode of operation.

It should be noted that the controller serves to manipulate the music reading indicia using a plurality of methods including scrolling the music reading indicia page-by-page upwardly and scrolling the music reading indicia page-by-page laterally. In addition to scrolling page-by-page, the controller may also be adapted to scroll continuously in minute incremental shifts. Finally, the controller may also manipulate the music reading indicia by highlighting with a cursor or the like a current position on the music sheet between scrolling. In order to choose a mode of operation and how the music reading indicia is manipulated, a user may use a menu button on the housing or portable unit. In addition to the menu controls, the play, stop and pause buttons may be used to selectively halt operation. Further, font size, contrast/brightness, and page numbers may also be adjusted per the desires of the user. Communication with a laptop computer may also be employed to render further capabilities.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic music reading system comprising, in combination:

a housing including a pair of panels each with a planar rectangular configuration and having an inner face, an outer face and a thin periphery formed therebetween, the panels of the housing being hingably coupled along the peripheries thereof for being folded in a first orientation with the inner faces abutting and a second orientation with the inner faces in coplanar relationship;

a pair of liquid crystal displays each mounted on one of the inner faces of the panels for displaying music reading indicia thereon, wherein each panel defines a frame on the inner face of the associated panel which is defined by a top portion, a bottom portion, an inner side portion and an outer side portion;

a microphone mounted on the top portion of the frame of a first one of the panels adjacent to the inner side portion for receiving audio signals;

a metronome unit mounted on the outer side portion of the frame of the first panel adjacent to the top portion thereof for generating a plurality of intermittent signals upon the actuation thereof, the metronome unit including a vertical slider switch for selecting a speed at which the intermittent signals are generated, a push button positioned below the slider switch for selectively actuating the metronome unit, a speaker for audibly transmitting the intermittent signals, and a mute button for selectively deactuating the speaker;

a portable unit including a case with a rectangular configuration and a top face having a plurality of numeric keys, a play button, a pause button, a stop button, and a pair of toggle keys, the portable unit removably connected to a port on the bottom portion of the frame of the first panel via an elongated wire;

a storage device drive positioned within the housing for removably receiving a portable storage device and reading therefrom music reading indicia; and a controller positioned within the housing and connected between the displays, the microphone, the metronome unit, the portable unit, and the storage device drive, the music reading indicia being readable by the controller from the portable storage device for displaying the same on the displays while the controller operates in a first mode of operation for manipulating the music reading indicia on the display as a function of the audio signals received via the microphone, a second mode of operation for manipulating the music reading indicia on the display as a function of the intermittent signals received from the metronome unit, and a third mode of operation for manipulating the music reading indicia on the display as a function of the depression of the toggle keys of the portable unit, wherein the controller is being for manipulating the music reading indicia using a plurality of methods including scrolling the music reading indicia page-by-page upwardly, scrolling the music reading indicia page-by-page laterally, and highlighting the music reading indicia between scrolling.

2. An electronic reading system comprising:

a housing;

a display mounted on the housing;

a storage device drive positioned within the housing for removably receiving a portable storage device and reading therefrom reading indicia;

an input device for accepting signals, the input device being a pair of toggle keys, wherein the toggle keys are positioned on a portable unit connected to the housing remote therefrom; and a controller positioned within the housing and connected between the display, the storage device drive, and the input device, the reading indicia being readable by the controller from the portable storage device for displaying the same on the display while manipulating the reading indicia on the display as a function of the signals received from the input device.

3. An electronic reading system as set forth in claim 2 wherein the reading indicia is music reading indicia.

4. An electronic reading system as set forth in claim 3 wherein the input device is a metronome and the signals are intermittent signals.

5. An electronic reading system as set forth in claim 2 wherein the input device is a microphone and the signals are audio signals.

6. An electronic reading system as set forth in claim 2 wherein the controller manipulates the reading indicia by scrolling the reading indicia page-by-page upwardly.

7. An electronic reading system as set forth in claim 2 wherein the controller manipulates the reading indicia by scrolling the reading indicia page-by-page laterally.

8. An electronic reading system as set forth in claim 2 wherein the controller manipulates the reading indicia by highlighting the reading indicia between scrolling.

9. An electronic reading system as set forth in claim 2 wherein the housing includes a pair of panels each with a substantially planar rectangular configuration and having an inner face, an outer face and a thin periphery formed therebetween, the panels of the housing being hingably coupled along the peripheries thereof for being folded in a first orientation with the inner faces abutting and a second orientation with the inner faces in coplanar relationship.

* * * * *